US008909871B2

(12) United States Patent
Arimilli et al.

(10) Patent No.: US 8,909,871 B2
(45) Date of Patent: Dec. 9, 2014

(54) DATA PROCESSING SYSTEM AND METHOD FOR REDUCING CACHE POLLUTION BY WRITE STREAM MEMORY ACCESS PATTERNS

(75) Inventors: Ravi K. Arimilli, Austin, TX (US);
Francis P. O'Connell, Austin, TX (US);
Hazim Shafi, Redmond, WA (US);
Derek E. Williams, Austin, TX (US);
Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 11/462,115

(22) Filed: Aug. 3, 2006

(65) Prior Publication Data
US 2008/0046736 A1 Feb. 21, 2008

(51) Int. Cl.
G06F 12/02 (2006.01)
G06F 12/08 (2006.01)

(52) U.S. Cl.
CPC .................................. *G06F 12/0888* (2013.01)
USPC ......................................................... 711/139

(58) Field of Classification Search
CPC .................................... G06F 12/0888
USPC .................................................. 711/138–139
See application file for complete search history.

(56) References Cited

U.S. PATENT DOCUMENTS

| 4,445,177 | A | * | 4/1984 | Bratt et al. | 712/245 |
| 5,247,639 | A | * | 9/1993 | Yamahata | 711/138 |
| 5,909,698 | A | * | 6/1999 | Arimilli et al. | 711/145 |
| 7,302,528 | B2 | * | 11/2007 | Cabot et al. | 711/138 |

* cited by examiner

*Primary Examiner* — April Y Blair
*Assistant Examiner* — Nicholas Simonetti
(74) *Attorney, Agent, or Firm* — Russell Ng PLLC; Libby Z Toub

(57) ABSTRACT

A data processing system includes a system memory and a cache hierarchy that caches contents of the system memory. According to one method of data processing, a storage modifying operation having a cacheable target real memory address is received. A determination is made whether or not the storage modifying operation has an associated bypass indication. In response to determining that the storage modifying operation has an associated bypass indication, the cache hierarchy is bypassed, and an update indicated by the storage modifying operation is performed in the system memory. In response to determining that the storage modifying operation does not have an associated bypass indication, the update indicated by the storage modifying operation is performed in the cache hierarchy.

16 Claims, 5 Drawing Sheets

DATA PROCESSING SYSTEM AND METHOD FOR REDUCING CACHE POLLUTION BY WRITE STREAM MEMORY ACCESS PATTERNS

BACKGROUND OF THE INVENTION

1. Technical Field

The present invention relates generally to data processing systems and specifically to memory access operations within data processing systems. Still more particularly, the present invention relates to the reduction of cache pollution in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from memory. In some multiprocessor (MP) systems, the cache hierarchy includes at least two levels. The level one (L1), or upper-level cache is usually a private cache associated with a particular processor core and cannot be accessed by other cores in an MP system. Typically, in response to a memory access instruction such as a load or store instruction, the processor core first accesses the upper-level cache. If the requested memory block is not found in the upper-level cache or the memory access request cannot be serviced in the upper-level cache (e.g., the L1 cache is a store-though cache), the processor core then access lower-level caches (e.g., level two (L2) or level three (L3) caches) to service the memory access to the requested memory block. The lowest level cache (e.g., L2 or L3) is often shared among several processor cores.

A coherent view of the contents of memory is maintained in the presence of potentially multiple copies of individual memory blocks distributed throughout the computer system through the implementation of a coherency protocol. The coherency protocol, for example, the well-known Modified, Exclusive, Shared, Invalid (MESI) protocol, entails maintaining state information associated with each cached copy of the memory block and communicating at least some memory access requests between processing units to make the memory access requests visible to other processing units.

When executing in such conventional computer systems, streaming applications commonly write contiguous data words into large arrays without frequent reuse of the store data, leading to "pollution" of the cache hierarchy as the array data of the streaming application displaces other data from the caches. For example, a streaming application may execute code that performs the following function:

for (=0;*i*<*N*;*i*++)

C[i]=A[i]+B[i]

where N is a large integer. Such code generally writes a large amount (i.e., N words) of contiguous memory locations for array C, generally leading to the casting out or deallocation of a substantial amount of data that may soon be accessed again in favor of other data that is unlikely to soon be accessed. Even in cases in which the memory allocated to array C is not contiguous, all bytes in nearly all memory blocks belonging to array C are overwritten, displacing potentially useful data that may subsequently need to be reloaded into the cache.

SUMMARY OF THE INVENTION

According to the present invention, the foregoing shortcomings with conventional data processing systems are addressed by an improved data processing system, method of data processing and program product.

According to one embodiment, a data processing system includes a system memory and a cache hierarchy that caches contents of the system memory. According to one method of data processing, a storage modifying operation having a cacheable target real memory address is received. A determination is made whether or not the storage modifying operation has an associated bypass indication. In response to determining that the storage modifying operation has an associated bypass indication, the cache hierarchy is bypassed, and an update indicated by the storage modifying operation is performed in the system memory. In response to determining that the storage modifying operation does not have an associated bypass indication, the update indicated by the storage modifying operation is performed in the cache hierarchy.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
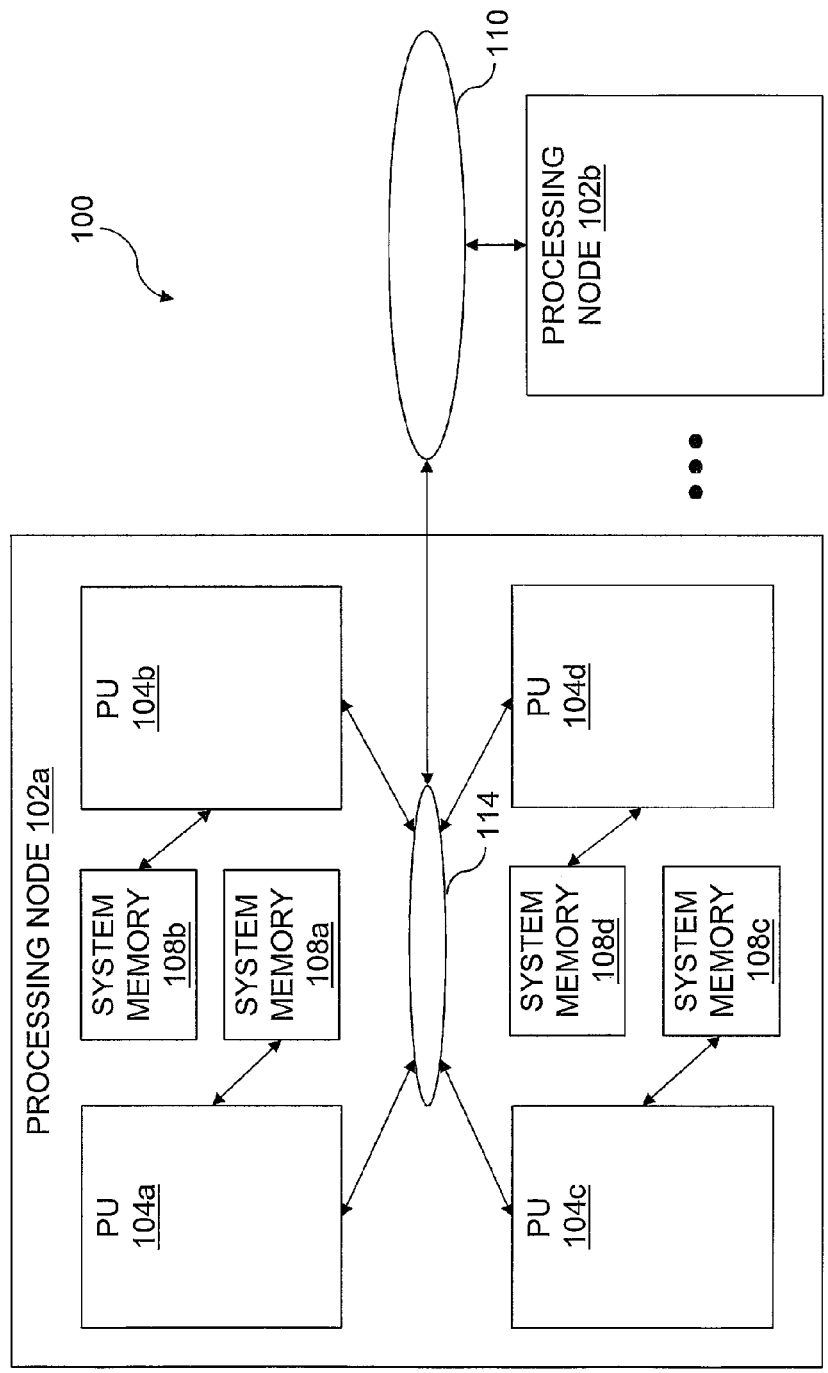
FIG. 1 is a high-level block diagram of an exemplary data processing system in accordance with the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

Figure 2A:
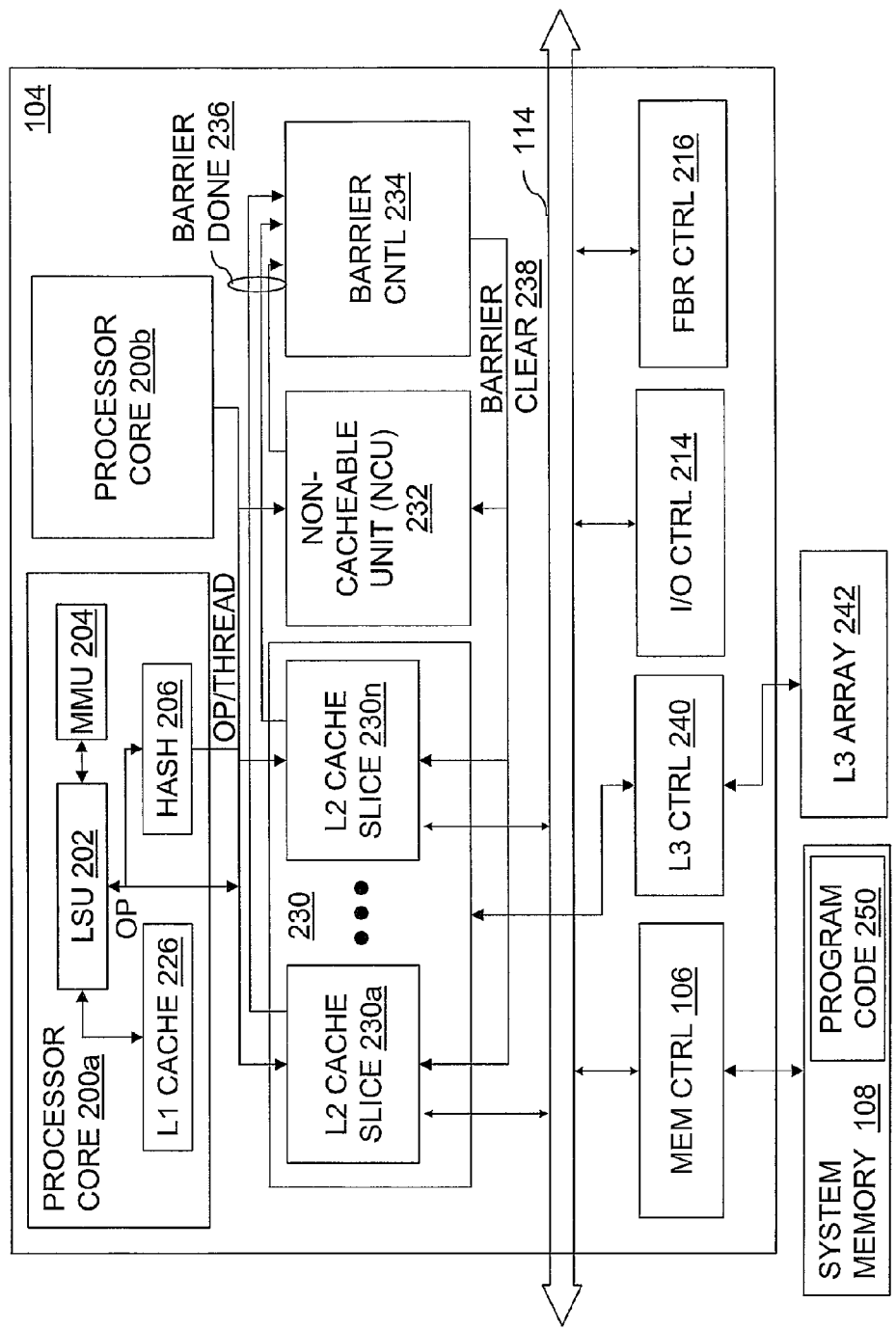
FIG. 2A is a more detailed block diagram of an exemplary processing unit in accordance with the present invention.

As depicted in FIG. 2A, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments of the invention, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Referring now to FIG. 2A, there is depicted a more detailed block diagram of an exemplary processing unit 104 in accordance with the present invention. In the depicted embodiment, each processing unit 104 includes two processor cores 200a, 200b for independently processing instructions and data. In one preferred embodiment, each processor core 200 supports multiple (e.g., two) concurrent hardware threads of execution. As depicted, each processor core 200 includes one or more execution units, such as load-store unit (LSU) 202, for executing or interpreting instructions within program code, such as program code 250. The instructions executed by LSU 202 include memory access instructions, such as load instructions and storage modifying instructions, which request access to a memory block or cause the generation of a request for access to a memory block.

The operation of each processor core 200 is supported by a multi-level volatile memory subsystem having at its lowest level shared system memory 108, and at its upper levels, one or more levels of cache memory for caching data and instructions residing within cacheable addresses. In the illustrative embodiment, the cache memory hierarchy includes a store-through level one (L1) cache 226 within and private to each processor core 200, a respective store-in level two (L2) cache 230 shared by processor cores 200a, 200b, and an L3 victim cache of L2 castouts comprising an on-chip L3 controller 240 and off-chip L3 array 242. In order to efficiently handle multiple concurrent memory access requests to cacheable addresses, L2 cache 230 (and optionally other lower level caches) is implemented with multiple cache slices 230a-230n, each of which handles memory access requests for a respective set of cacheable real memory addresses.

Although the illustrated cache hierarchies includes three levels of cache, those skilled in the art will appreciate that alternative embodiments may include fewer levels or additional levels (e.g., L4) of on-chip or off-chip in-line, lookaside or victim caches, which may be fully inclusive, partially inclusive, or non-inclusive of the contents the upper levels of cache.

Processing unit 104 further includes a non-cacheable unit (NCU) 232 that performs accesses to non-cacheable (i.e., cache inhibited) real memory addresses in system memories 108 or I/O and a barrier controller 234 that enforces barrier operations that synchronize store operations across L2 cache slices 230a-230n and NCU 232. As indicated, to support such synchronization, barrier controller 234 is coupled to each of L2 cache slices 230a-230n and NCU 232 by a respective one of barrier done signals 236 and is coupled to all of L2 cache slices 230a-230n and NCU 232 by a barrier clear signal 238.

Each processing unit 104 further includes an integrated I/O (input/output) controller 214 supporting the attachment of one or more I/O devices. I/O controller 214 may issue read and write operations on its local interconnect 114 and system interconnect 110, for example, in response to requests by attached I/O device (not depicted). Communication on the communication fabric comprising local interconnect 114 and system interconnect 110 is controlled by a fabric controller 216.

Figure 2B:
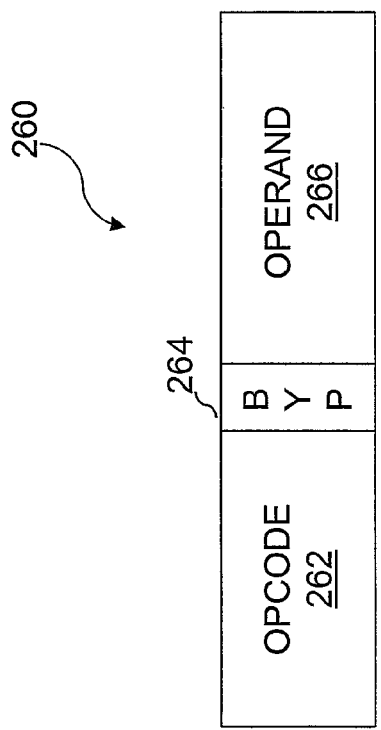
FIG. 2B illustrates a exemplary embodiment of a storage modifying instruction containing a cache bypass indication in accordance with one embodiment of the present invention.

In operation, when an application thread under execution by a processor core 200 includes a storage modifying instruction, LSU 202 executes the storage modifying instruction to obtain a target address for the indicated memory access operation. As shown in FIG. 2B, an exemplary embodiment of a storage modifying instruction 260 includes an operation code (opcode) field 262 specifying the operation to be performed and an operand field 266 specifying one or more operands of the specified operation, for example, identifiers of registers containing the store data and data from which the target real address of the target memory block to which the data is to be written will be computed. As further illustrated in FIG. 2B, storage modifying operation 260 may further include a bypass field 264 that may optionally form a portion of opcode field 262.

In an exemplary embodiment, bypass field 264 is set to "1" to indicate that the storage modifying operation specified by opcode 262 is a candidate for bypassing the cache hierarchy and being performed only at the lowest level of volatile storage (i.e., system memory). Conversely, a value of "0" for bypass field 264 indicates that the storage modifying operation should be performed in a data array of the cache hierarchy. In this manner, a programmer or compiler can mark bypass fields 264 of particular storage modifying instructions 260 to prevent pollution of the cache hierarchy with selected store data, such as that of streaming applications. Storage modifying instructions within program code 250 that are either purposely unmarked by the programmer and/or compiler or are unmarked because program code 250 is legacy object code are assigned the default bypass field value of "0".

Depending upon implementation, the target address resulting from execution of storage modifying instruction 260 may require further address translation by a memory management unit (MMU) 204 to obtain the target real address of the memory access operation. As is well known to those skilled in the art, such address translation generally includes access to a page table entry defining a mapping between an effective or virtual address space and the real address space. The page table entry generally also includes bit fields defining additional attributes of the memory page, such as whether or not the addresses contained therein are cacheable/cache-inhibited, etc.

In accordance with at least some embodiments of the present invention, these page attributes may be utilized to provide an alternative or supplemental mechanism to bypass field 254 by which to identify storage modifying operations that are candidates for bypassing the cache hierarchy to reduce cache pollution. In particular, the page attributes preferably include a bypass attribute that can be set by software to indicate whether or not storage modifying operations targeting that memory page are candidates for bypassing the cache hierarchy to reduce cache pollution. It will be appreciated that this bypass attribute differs from a conventional cache-inhibited attribute in that the assertion of a cache-inhibited attribute prevents all caching of the data within the memory page, while the assertion of the bypass attribute permits the caching of data obtained by read and prefetch operations, but causes selected write operations (selected based upon the state of the bypass attribute) to be performed in the system memory. In embodiments including both a cache-inhibited attribute and bypass attribute in the page table entries, the bypass attribute for a particular memory page is ignored if the cache-inhibited attribute for that memory page is asserted.

Figure 4:
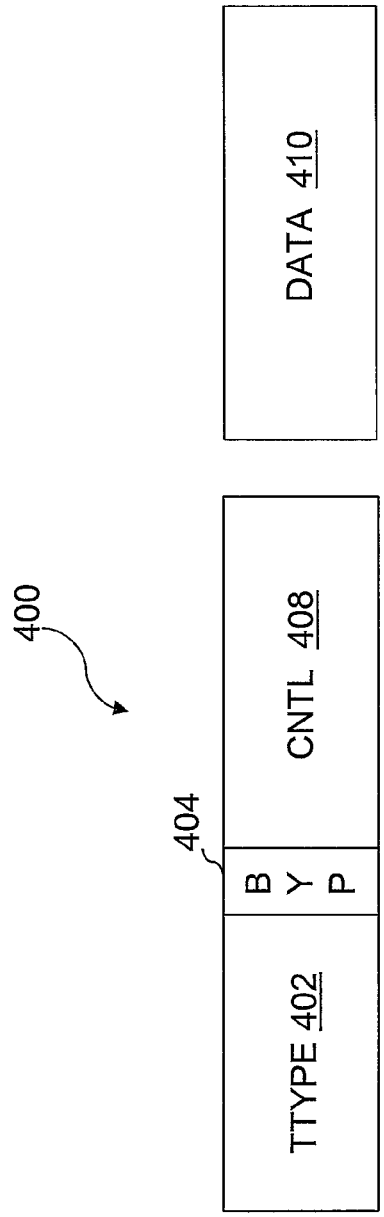
FIG. 4 illustrates an exemplary embodiment of a storage modifying operation containing a cache bypass indication in accordance with one embodiment of the present invention.

Following the address translation, the processor core 200 transmits the storage modifying operation to the appropriate destination for handling. That is, storage modifying operations targeting non-cacheable real memory addresses are dispatched directly to NCU 232. Storage modifying operations having cacheable target real addresses are first processed by hash logic 206 to identify the appropriate destination (e.g., L2 cache slice 230a-230n). As shown in FIG. 4, an exemplary storage modifying operation 400 transmitted from processor core 200 to an L2 cache slice 230 includes a transaction type (ttype) 402, control information 408 including the target real address, and store data 410. In addition, storage modifying operation 400 includes a bypass field 404 set in accordance with bypass field 264 of the associated storage modifying instruction or bypass attribute from the page table entry. If both a bypass field 264 and bypass attribute are present in a particular embodiment, bypass field 404 of the storage modifying operation is formed by a logical OR of both.

Figure 3:
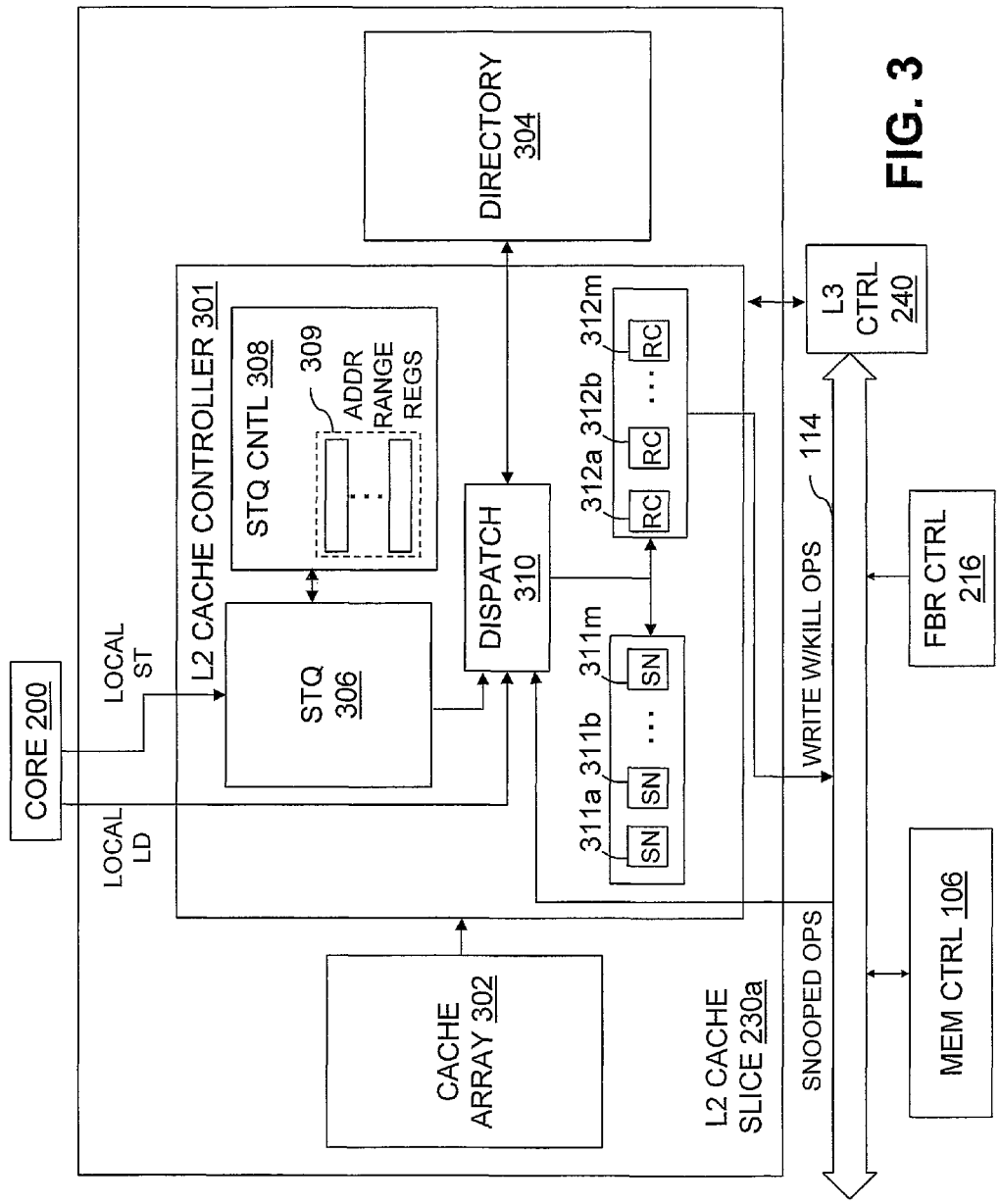
FIG. 3 is a more detailed block diagram of an exemplary L2 cache slice in accordance with the present invention.

With reference now to FIG. 3, there is illustrated a more detailed block diagram of an exemplary embodiment of one of L2 cache slice 230a-230n (in this case, L2 cache slice 230a) in accordance with the present invention. As shown in FIG. 3, L2 cache slice 230a includes a cache array 302 and a directory 304 of the contents of cache array 302. Assuming cache array 302 and directory 304 are set associative as is conventional, cacheable memory locations in system memories are mapped to particular congruence classes within cache array 302 utilizing predetermined index bits within the system memory (real) addresses. The particular memory blocks stored within cache array 302 are recorded in cache directory 304, which contains one directory entry for each cache line in cache array 302. While not expressly depicted in FIG. 3, it will be understood by those skilled in the art that each directory entry in cache directory 304 includes various entry identifier and indexing fields such as tag fields that use a portion of the corresponding real address to specify the particular cache line stored in cache array 302, state fields that indicate the coherency state of the cache lines, and a LRU (Least Recently Used) field indicating a replacement order for the cache line with respect to other cache lines in the same congruence class.

L2 cache slice 230a further includes an L2 cache controller 301 that controls access to cache array 302 and directory 304 in response to memory access requests received from local processor core 200 and memory operations of other processor cores 200 snooped on local interconnect 114. As depicted, L2 cache controller 301 includes a store queue (STQ) 306 for buffering and gathering local store operations, an associated STQ controller 308, and a dispatch pipeline 310. STQ controller 308 may optionally further include software-accessible address range registers 309 that, like the bypass attributes previously described, define one or more regions of real memory for which storage modifying operations are candidates for bypassing the cache hierarchy to reduce cache pollution.

L2 cache controller 301 further includes multiple Read-Claim (RC) machines 312a-312m for independently and concurrently servicing cacheable load (LD) and store (ST) requests received from the affiliated (i.e., local) processor core 200 and multiple snoop machines 311a-311m for independently and concurrently handling remote memory access requests snooped from local interconnect 114. As will be appreciated, the servicing of memory access requests by RC machines 312 may require the replacement or invalidation of memory blocks within cache array 302. Accordingly, L2 cache slice 230a may further include unillustrated CO (castout) machines that manage the removal and writeback of memory blocks from cache array 302 to the L3 cache and/or system memory 108.

In operation, storage modifying operations of the local processor core 200 (denoted LOCAL ST in FIG. 3) are received and buffered by STQ 306 under the control of STQ controller 308. STQ controller 308 preferably directs store gathering of storage modifying operations targeting the same memory block in order to improve storage access efficiency. STQ controller 308 is preferably configured to gather storage modifying operations that are candidates to bypass the cache hierarchy with other storage modifying operations that are not intended to bypass the cache hierarchy, with the resulting gathered operation marked to bypass the cache hierarchy or not to bypass the cache hierarchy, depending on the choice of implementation. However, in alternative embodiments, gathering of storage modifying operations that are candidates to bypass the cache hierarchy may be restricted to other storage modifying operations that are candidates to likewise bypass the cache hierarchy.

When STQ controller 308 determines a storage modifying operation buffered within STQ 306 is ready for servicing, STQ controller 308 presents the storage modifying operation, including a bypass indication obtained from bypass field 404 or address range registers 309, to dispatch pipeline 310. Unillustrated arbitration logic arbitrates during each cycle among such storage modifying operations, local load operations received from processor core 200, and snooped operations received from local interconnect 114 to select an operation for processing by dispatch pipeline 310. Dispatch pipeline 310 performs a lookup in directory 304 for each such operation and dispatches snooped operations to snoop machines 311 for servicing. Dispatch pipeline 310 further dispatches local load operations and storage modifying operations to RC machines 312 for servicing.

Figure 5:
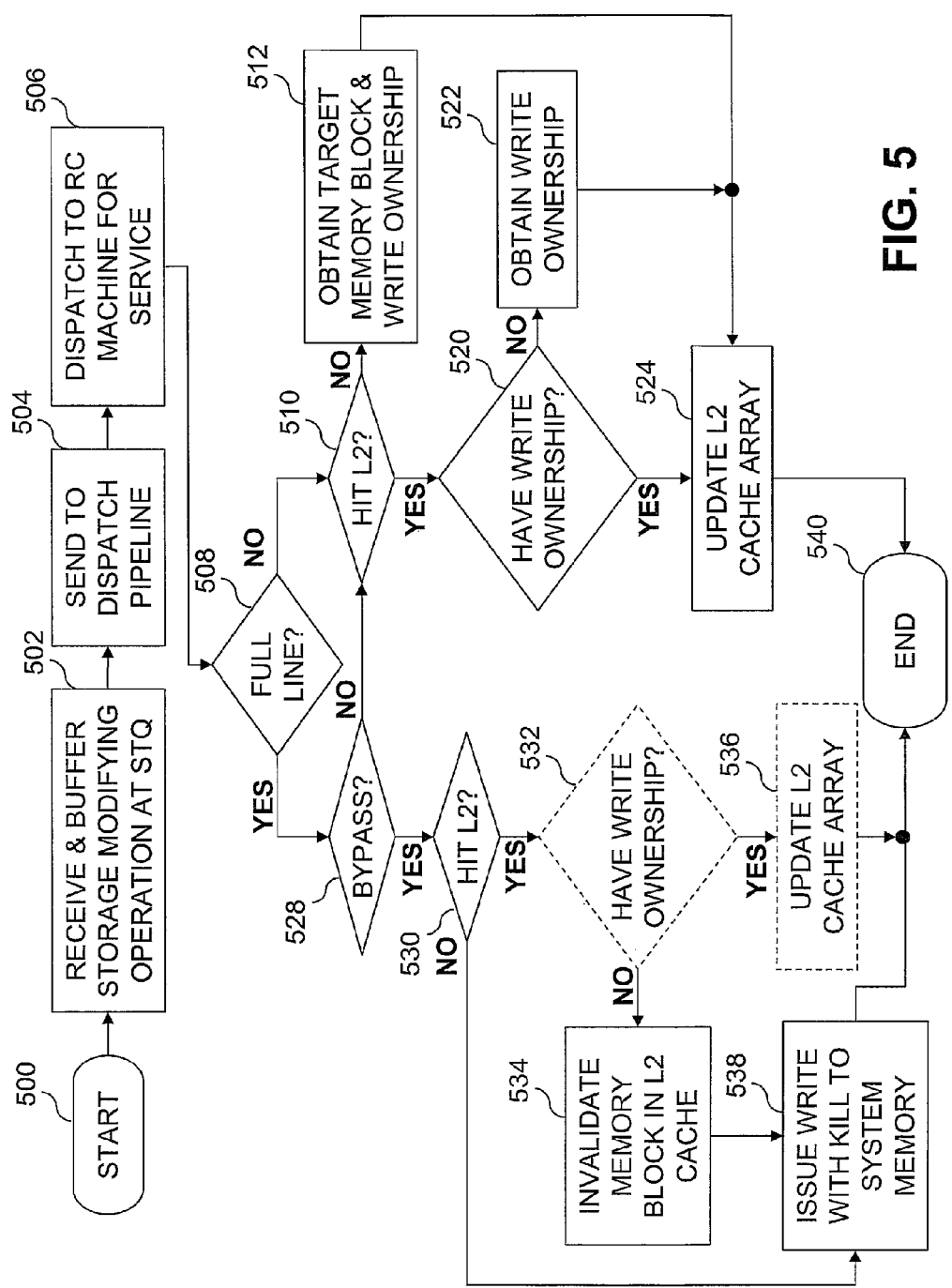
FIG. 5 is a high level logical flowchart of an exemplary method of servicing a storage modifying operation in accordance with the present invention.

Referring now to FIG. 5, there is depicted a high level logical flowchart of an exemplary method of servicing local processor cacheable storage modifying operations in a memory subsystem in accordance with the present invention. As a logical flowchart, logical rather than temporal relationships between steps are depicted, and at least some of the steps may be performed in an alternative order or concurrently.

As depicted, the process begins at block 500 and thereafter proceeds to block 502, which depicts an L2 cache slice 230 receiving and buffering a storage modifying operation within its STQ 306. As noted above, the storage modifying operation may optionally be gathered with one or more other storage modifying operations to form a single gathered storage modifying operation. In scientific code in which cache pollution is of particular concern, it is typical that the gathering performed in STQ 306 results in gathered storage modifying operations that update all bytes within a target memory block. When STQ controller 308 determines that a storage modifying operation is ready to be removed from STQ 306, STQ controller 308 presents the storage modifying operation, along with an asserted or deasserted bypass indication, to dispatch pipeline 310 for processing (block 504). STQ controller 308 also passes a "full line" indication indicating whether or not the storage modifying operation updates all bytes in the target memory block.

After arbitration, the storage modifying operation is placed within dispatch pipeline 310. During the tenure of the storage modifying operation within dispatch pipeline 310, dispatch pipeline 310 initiates a lookup of the target real address of the storage modifying operation within directory 304. The directory lookup returns at least a hit/miss indication and coherency state information. Next, at block 506, dispatch pipeline 310 dispatches the storage modifying operation together with its hit/miss indication, coherency state information and full line indication to a selected RC machine 312 for processing.

In response to receipt of the storage modifying operation, the RC machine 312 examines the full line and bypass indications associated with the storage modifying operation, as shown at blocks 508 and 528. If the full line indication and the bypass indication are both asserted, the process passes to block 530 and following blocks, which are described below. If, on the other hand, either of the full line indication or the bypass indication is not asserted, the process passes to block 510.

Block 510 illustrates RC machine 312 examining the hit/miss indication to determine if the target real address of the storage modifying operation hit in directory 304. If the target real address missed in directory 304, the process passes to block 512, which depicts RC machine 312 obtaining a copy of the target memory block and write ownership rights to the target memory block through communication (e.g., a read-with-intent-to-modify (RWITM) operation) on local interconnect 114. The RC machine 312 then directs an update to L2 cache array 302 with the copy of the target memory block as modified by the store data of the storage modifying operation (block 524). Thereafter, the process terminates at block 540.

Returning to block 510, if RC machine 312 determines that that hit/miss indication indicates that the target address of the storage modifying operation hit in directory 304, RC machine 312 also determines at block 520 whether or not the coherency state information obtained from directory 304 indicates that L2 cache slice 230 presently has write ownership of the target memory block (e.g., the coherency state is Modified (M)). If so, the process passes directly from block 520 to block 524, which illustrates RC machine 312 updating cache array 302 with the store data of the storage modifying operation. If not, RC machine 312 issues an operation (e.g., a Data Claim (DClaim)) on local interconnect 114 to obtain write ownership of the target memory block without requesting a copy of the target memory block, as shown at block 522. (No data transfer is required because the target memory block already resides in cache array 302.) The process then passes to block 524, which has been described. Following block 524, the process terminates at block 540.

Referring now to block 530, if both the bypass and full line indications are asserted for a local storage modifying operation, RC machine 312 determines if the hit/miss indication indicates a hit in directory 304. If not, RC machine 312 issues a write-with-kill operation on local interconnect 114, bypassing cache array 302. The write-with-kill operation directs the relevant memory controller 106 to update the system memory 108 assigned the target real address with the store data of the storage modifying operation and directs all caches affiliated with other processor cores 200 to invalidate their copies, if any, of the target memory block. In this manner, the storage update is made in system memory 108 rather than cache array 302, thereby avoiding pollution of cache array 302 with a memory block that is unlikely to soon be accessed. Following block 538, the process terminates at block 540.

Referring again to block 530, if RC machine 312 determines that the hit/miss indication indicates that the target real address of the storage modifying operation hit in directory 304, the process may proceed directly to block 534, which illustrates RC machine 312 invalidating the target memory block in directory 304 (and if necessary in L1 cache 226). From block 534, the process passes to block 538, which has been described. Alternatively, RC machine 312 may optionally further determine at block 532 whether or not the coherency state information received from directory 304 indicates that L2 cache slice 230 presently possesses write ownership of the target memory block. If not, the process passes to block 534 and following blocks, which have been described. If, on the other hand, RC machine 312 determines at block 532 that the coherency state information indicates that L2 cache slice 230 presently possesses write ownership of the target memory block of the storage modifying operation, RC machine 312 may optionally dispatch the storage modifying operation to an RC machine to direct the performance of the storage update in cache array 302 despite the bypass indication, as shown at block 536. In this implementation, it is deemed advantageous to effectively ignore the bypass indication based upon the likelihood that another access will soon be made to the memory block in view of the presence of write ownership. Following block 536, the process terminates at block 540.

Those skilled in the art will be appreciated upon reference to FIG. 5 that modifications or refinements to the exemplary method disclosed therein are possible. For example, in other embodiments of the present invention, pollution of the cache can be reduced through a cache bypass in the presence of only a partial memory block update by performing a series of write-with-kill operations targeting the individual bytes to be updated in the target memory block. Cache pollution can similarly be reduced in alternative embodiments that support selective update of individual bytes of a memory block in a single storage modifying operation. Embodiments supporting such byte-enabled storage modifying operations also permit storage modifying operations that hit in cache in a coherency state other than a write ownership state to be serviced in the cache memory rather than in system memory by obtaining write ownership for the target memory block.

As has been described, the present invention provides an improved data processing system, method of data processing and program product that enable at least some storage modifying operations to be identified as "bypass" operations that are candidates for bypassing the cache hierarchy and be performed at the system memory. Storage modifying operations can be identified as bypass operations based upon instruction encodings, page table attributes, or the target addresses of the operations. The bypass indications can also be dynamically disregarded based upon coherency state information present in the local cache hierarchy at the time the storage modifying operations are serviced or other criteria, such as whether the storage modifying operation updates a full memory block of data.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

In addition, although the control logic that determines whether or not to bypass the cache hierarchy is described as residing within the RC machine of a lower level cache memory, those skilled in the art will appreciate that such control logic can be implemented at many different locations within a processing unit, such as within STQ controller 308 or dispatch pipeline 310.

What is claimed is:

1. A method of data processing in a data processing system having a system memory and a cache hierarchy that caches contents of said system memory, said method comprising:
   receiving, at a cache hierarchy, a storage modifying operation having a cacheable target real memory address;
   determining whether said storage modifying operation is directed to a full cache line;
   determining whether or not said storage modifying operation has an associated bypass indication;
   determining whether or not said storage modifying operation hit a cache in the cache hierarchy;
   in response to determining that said storage modifying operation is directed to a full cache line, has an associated bypass indication, and did not hit a cache in the cache hierarchy, bypassing the cache hierarchy and performing an update indicated by said storage modifying operation in said system memory;
   in response to determining that said storage modifying operation is directed to a full cache line, has an associated bypass indication, and hit a cache in the cache hierarchy, determining whether the cache that was hit has write ownership;
   in response to determining that the cache that was hit does not have write ownership, bypassing the cache hierarchy and performing an update indicated by said storage modifying operation in said system memory;
   in response to determining that the cache that was hit does have write ownership, performing said update indicated by said storage modifying operation in said cache hierarchy; and
   in response to determining that said storage modifying operation is directed to a full cache line and does not have an associated bypass indication, performing said update indicated by said storage modifying operation in said cache hierarchy.

2. The method of claim 1, wherein said determining comprises determining whether or not said storage modifying operation has an associated bypass indication based upon a field in a storage modifying instruction executed in said data processing system.

3. The method of claim 1, wherein:
   said method further comprises accessing a page table entry to determine said cacheable target real memory address; and
   said determining comprises determining whether or not said storage modifying operation has an associated bypass indication based upon a bypass attribute in the page table entry.

4. The method of claim 1, wherein said determining comprises determining whether or not said storage modifying operation has an associated bypass indication based upon whether said cacheable target real memory address is within a memory region defined by a set of address range registers.

5. The method of claim 1, wherein said step of bypassing the cache hierarchy and performing an update indicated by said storage modifying operation in said system memory comprises bypassing the cache hierarchy if the cacheable target real memory address is not cached within the cache hierarchy in a write ownership state.

6. The method of claim 1, and further comprising invalidating at least one locally cached copy of a target memory block associated with said cacheable target real memory address.

7. The method of claim 1, wherein said performing includes transmitting a write-with-kill operation on an interconnect fabric, wherein said write-with-kill operation invalidates any remotely cached copy of a memory block associated with said cacheable target real memory address.

8. A processing unit for a data processing system having a system memory and a cache hierarchy that caches contents of said system memory, said processing unit comprising:
   a processor core that processes a memory access instruction to generate a storage modifying operation; and
   control logic coupled to said processor core, wherein said control logic, responsive to receiving from said processor core a storage modifying operation having a cacheable target real memory address, determines whether said storage modifying operation is directed to a full cache line, has an associated bypass indication, and did not hit a cache in the cache hierarchy or when said storage modifying operation hit a cache in the cache hierarchy and the cache does not have write ownership and, if so, bypasses the cache hierarchy and causes the update indicated by said storage modifying operation to be performed in said system memory, and wherein said control logic, responsive to determining that said storage modifying operation is directed to a full cache line and does not have an associated bypass indication, is not directed to a full cache line, or is directed to a full cache line, has an associated bypass indication, and hits a cache in the cache hierarchy that has write ownership, causes said update indicated by said storage modifying operation to be performed in said cache hierarchy.

9. The processing unit of claim 8, wherein:
   said storage modifying operation includes said bypass indication; and said processor core asserts said bypass indication in said storage modifying operation based upon a bypass field in said memory access instruction.

10. The processing unit of claim 8, wherein:

said processor core accesses a page table entry to determine said cacheable target real memory address; and said processing core asserts said bypass indication based upon a bypass attribute in the page table entry.

11. The processing unit of claim 8, and further comprising a set of address range registers defining a memory region, wherein said control logic determines whether or not said storage modifying operation has an associated bypass indication based upon said set of address range registers.

12. The processing unit of claim 8, wherein said control logic causes the cache hierarchy to be bypassed and the update indicated by said storage modifying operation to be performed in said system memory if the cacheable target real memory address is not cached within the cache hierarchy in a write ownership state.

13. The processing unit of claim 8, wherein:

said cache hierarchy includes at least one local cache memory; and said control logic invalidates a copy of a target memory block associated with said cacheable target real memory address that is cached within said local cache memory.

14. The processing unit of claim 8, wherein:

said processing unit is coupled to an interconnect fabric of the data processing system; and said control logic bypasses the cache hierarchy and causes the update indicated by said storage modifying operation to be performed in said system memory by transmitting a write-with-kill operation on the interconnect fabric, wherein said write-with-kill operation invalidates any remotely cached copy of a memory block associated with said cacheable target real memory address.

15. A data processing system, comprising:

a processing unit in accordance with claim 8;

a cache hierarchy coupled to said processor core of said processing unit;

an interconnect fabric coupled to said processing unit; and a system memory coupled to said interconnect fabric.

16. The data processing system of claim 15, wherein said processing unit includes at least one level of cache memory within said cache hierarchy.

* * * * *